United States Patent
Yang et al.

(10) Patent No.: US 11,782,504 B2
(45) Date of Patent: Oct. 10, 2023

(54) TIMER-BASED EYE-TRACKING

(71) Applicant: AdHawk Microsystems, Kitchener (CA)

(72) Inventors: Fan Yang, London (CA); Brendan Redmond O'Hanlon, Prescott (CA); Nino Zahirovic, Waterloo (CA); Niladri Sarkar, Waterloo (CA); Mahdi Olfat, Kitchener (CA); Mohammad Mohsenzadeh, Waterloo (CA)

(73) Assignee: AdHawk Microsystems Inc., Waterloo (CA)

( * ) Notice: Subject to any disclaimer, the term of this patent is extended or adjusted under 35 U.S.C. 154(b) by 205 days.

(21) Appl. No.: 17/344,046

(22) Filed: Jun. 10, 2021

(65) Prior Publication Data

US 2021/0303064 A1   Sep. 30, 2021

Related U.S. Application Data

(63) Continuation of application No. 16/234,293, filed on Dec. 27, 2018, now Pat. No. 11,048,327.

(60) Provisional application No. 62/611,477, filed on Dec. 28, 2017.

(51) Int. Cl.
| | |
|---|---|
| *G06F 3/01* | (2006.01) |
| *G01S 17/66* | (2006.01) |
| *G02B 27/00* | (2006.01) |
| *G02B 26/08* | (2006.01) |
| *G02B 27/01* | (2006.01) |
| *G02B 26/10* | (2006.01) |

(52) U.S. Cl.
CPC .............. *G06F 3/013* (2013.01); *G01S 17/66* (2013.01); *G02B 27/0093* (2013.01); *G02B 27/0172* (2013.01); *G02B 26/0833* (2013.01); *G02B 26/101* (2013.01); *G02B 2027/0187* (2013.01)

(58) Field of Classification Search
CPC ...... G06F 3/013; G01S 17/66; G02B 27/0093
See application file for complete search history.

(56) References Cited

U.S. PATENT DOCUMENTS

| | | |
|---|---|---|
| 5,638,176 A | 6/1997 | Hobbs et al. |
| 7,388,699 B1 | 6/2008 | Coffee |
| 10,824,229 B2 | 11/2020 | Sarkar |
| 11,048,327 B2 | 6/2021 | Yang et al. |
| 2002/0014579 A1 | 2/2002 | Dunfield |
| 2004/0061831 A1 | 4/2004 | Aughey et al. |
| 2004/0120023 A1 | 6/2004 | Bush et al. |
| 2007/0001248 A1 | 1/2007 | Geisberger et al. |

(Continued)

OTHER PUBLICATIONS

Non-Final Rejection dated Oct. 27, 2020 for U.S. Appl. No. 16/234,293.

(Continued)

*Primary Examiner* — Cara E Rakowski

(74) *Attorney, Agent, or Firm* — KAPLAN BREYER SCHWARZ, LLP

(57) ABSTRACT

Aspects of the present disclosure describe systems, methods, and structures that provide eye-tracking by 1) steering a beam of light through the effect of a microelectromechanical system (MEMS) onto a surface of the eye and 2) detecting light reflected from features of the eye including corneal surface, pupil, iris—among others. Positional/geometric/feature/structural information pertaining to the eye is determined from timing information associated with the reflected light.

22 Claims, 14 Drawing Sheets

---

1. Measure the signal levels corresponding to specular glints from the cornea, diffuse reflections from the iris, and the lower signal levels (lack of iris reflection) from the pupil;

2. Set a threshold voltage for a comparator between the low level signal from the pupil and the diffuse reflection signal level from the iris;

3. Capture pulses that correspond to the pupil edge transitions for a period of time and perform ellipse fitting technique described above; and 4. Apply correction factors to compensate for the refractive index of the cornea/lens and the direction in which the eye is pointing in order to reveal the pupil size.

(56) References Cited

U.S. PATENT DOCUMENTS

| | | |
|---|---|---|
| 2007/0081241 A1 | 4/2007 | Hayashi |
| 2008/0266818 A1 | 10/2008 | Collet et al. |
| 2009/0062658 A1 | 3/2009 | Dunki-Jacobs et al. |
| 2013/0242364 A1 | 9/2013 | Kilcher et al. |
| 2015/0047078 A1 | 2/2015 | Sarkar et al. |
| 2015/0235355 A1 | 8/2015 | Mullins |
| 2016/0029883 A1 | 2/2016 | Cox |
| 2016/0166146 A1 | 6/2016 | Sarkar |
| 2016/0240013 A1 | 8/2016 | Spitzer |
| 2017/0038253 A1 | 2/2017 | Mallinson |
| 2017/0067609 A1 | 3/2017 | Ichikawa et al. |
| 2017/0115483 A1 | 4/2017 | Aleem et al. |
| 2017/0123489 A1 | 5/2017 | Guenter |
| 2017/0364732 A1 | 12/2017 | Komogortsev |
| 2018/0189977 A1 | 7/2018 | Zecchini et al. |
| 2018/0210547 A1 | 7/2018 | Sarkar |
| 2019/0120940 A1 | 4/2019 | Pei et al. |
| 2019/0204913 A1 | 7/2019 | Sarkar et al. |
| 2022/0261074 A1 | 8/2022 | Zahirovic et al. |

OTHER PUBLICATIONS

Notice of Allowance and Fees Due (PTOL-85) dated Mar. 5, 2021 for U.S. Appl. No. 16/234,293.
Notice of Allowance and Fees Due (PTOL-85) dated May 18, 2022 for U.S. Appl. No. 17/143,048.
Notice of Allowance and Fees Due (PTOL-85) dated Oct. 19, 2022 for U.S. Appl. No. 17/673,337.
Notice of Allowance received for U.S. Appl. No. 17/673,337, dated Oct. 27, 2022, 2 pages.
Notice of Allowance and Fees Due (PTOL-85) dated Mar. 23, 2022 for U.S. Appl. No. 17/087,302.
Final Rejection dated Jun. 15, 2020 for U.S. Appl. No. 15/876,148.
Final Rejection received for U.S. Appl. No. 15/876,148, dated Aug. 23, 2019, 11 pages.
Jacob Engelberg et al., "The Advantages of metalenses over diffractive lenses," "Nature Communications", vol. 11, dated 2020 (https://doi.org/10.1038/s41467-020-15972-9), 4 pp.
Non-Final Office Action received for U.S. Appl. No. 15/876,148, dated Feb. 24, 2020, 15 pages.
Non-Final Rejection dated Apr. 29, 2021 for U.S. Appl. No. 16/232,410.
Non-Final Rejection dated Jan. 7, 2022 for U.S. Appl. No. 17/143,048.
Non-Final Rejection dated Jun Jun. 18, 2020 for U.S. Appl. No. 16/236,993.
Non-Final Rejection dated Sep. 3, 2021 for U.S. Appl. No. 17/087,302.
Non-Final Rejection received for U.S. Appl. No. 15/876,148, dated May 3, 2019, 9 pages.
Notice of Allowance and Fees Due (PTOL-85) dated Jul. 16, 2020 for U.S. Appl. No. 15/876,148.
Notice of Allowance and Fees Due (PTOL-85) dated Oct. 7, 2020 for U.S. Appl. No. 16/236,993.
Notice of Allowance dated Oct. 20, 2021 for U.S. Appl. No. 16/232,410.
Zhaoyi Li et al., "Meta-Optics achieves RGB-achromatic focusing for virtual reality," Science Advances, vol. 7, No. 5, Jan. 27, 2021 (www.doi.org/10.1126/sciadv.abe4458), 8 pp.

FIG. 11

1. Scan a horizontal line at a vertical offset that produces pulses at one of several photodiodes;

2. Sweep the frequency of the signal that drives the horizontal axis while measuring the pulse width received by the photodiode;

3. The resonant frequency of the MEMS scanner corresponds to the frequency at which the pulse width is minimized. The slope of the phase of the pulse with respect to the drive signal should be at a maximum at this frequency as well. The phase should shift by 180 degrees as the device sweeps through its resonance as well;

4. Select a frequency that is offset from resonance (e.g. 10% higher or lower);

5. Perform steps 1-4 for the vertical axis;

6. While running both axes at their selected frequencies, measure the pulse density received by each of the photodiodes; and 7. Fine tune the frequencies in order to maximize the pulse densities received at the various photodiodes

FIG. 12

1. For a given photodiode, collect rising and falling edge timings for a period of time;

2. Fit an ellipse to the contour defined by these points;

3. Use an algorithm (e.g., RANSAC) to reject outlier ellipses;

4. Relate some aspect of the geometry of the ellipse (e.g., its center, size, orientation) to a glint location, which serves as an input to the eye model and;

5. Using multiple ellipses from multiple photodiodes, use the eye model to produce an estimate of the gaze direction.

FIG. 13

1. Measure the signal levels corresponding to specular glints from the cornea, diffuse reflections from the iris, and the lower signal levels (lack of iris reflection) from the pupil;

2. Set a threshold voltage for a comparator between the low level signal from the pupil and the diffuse reflection signal level from the iris;

3. Capture pulses that correspond to the pupil edge transitions for a period of time and perform ellipse fitting technique described above; and 4. Apply correction factors to compensate for the refractive index of the cornea/lens and the direction in which the eye is pointing in order to reveal the pupil size.

TIMER-BASED EYE-TRACKING

CROSS REFERENCE TO RELATED APPLICATIONS

This application is a continuation of U.S. patent application Ser. No. 16/234,293, filed Dec. 27, 2018, which claims the benefit of U.S. Provisional Patent Application Ser. No. 62/611,477 filed 28 Dec. 2017, each of which is incorporated by reference as if set forth at length herein. In addition, this application includes concepts disclosed in United States Patent Publication No. 2016/0166146 published 16 Jun. 2016 and United States patent Publication No. 2017/0276934 published 28 Sep. 2017, each of which is incorporated by reference as if set forth at length herein.

TECHNICAL FIELD

This disclosure relates generally to human—computer interfaces and more specifically to eye-tracking systems, methods and structures that advantageously provide real-time measurements of eye-tracking and eye fixations.

BACKGROUND

As is known by those skilled in the art, human—computer interfaces are expected to take advantage of visual input mechanisms including eye-tracking mechanisms—resulting from a current trend in the emerging Virtual and Augmented Reality (VR/AR) enterprise.

Of additional note, such eye-tracking mechanisms are expected to find widespread applicability in medical ophthalmology, behavioral psychology, and consumer measurement fields as well.

Given such applicability and importance, improved eye-tracking systems, methods and/or structures would represent a welcome addition to the art.

SUMMARY

The present disclosure enables eye tracking without some of the costs and disadvantages of eye-tracking systems of the prior art. An advance in the art is made according to aspects of the present disclosure directed to systems, methods, and structures providing timer-based eye-tracking that advantageously facilitate a seamless, intuitive, non-invasive, interactive user interface between that user and smart devices including computers.

In addition to such human-computer interactions, timer-based eye-tracking systems, methods and structures according to aspects of the present disclosure advantageously facilitate the development of ophthalmological measurement instruments for determining geometric and/or other eye features exhibiting a precision and reproducibility unknown in the art. Such determinations advantageously include shape(s), geometry(ies), of eye feature(s) including the cornea, iris, sclera, etc., as well as their respective interfaces.

Finally, systems, methods, and structures providing timer-based eye-tracking according to aspects of the present disclosure advantageously facilitate the measurement of subject eye-movements during—for example—psychological or consumer behavior studies and evaluations.

In a broad context, systems, methods, and structures according to the present disclosure provides eye-tracking by 1) steering a beam of light through the effect of a microelectromechanical system (MEMS) operating at or near a resonant frequency, onto eye structures, such as corneal surface, iris, and/or sclera; 2) detecting—by one or more discrete detectors (i.e., 4, 6, 8, etc.)—the light reflected from the eye; and 3) tracking the timings at which reflections from the eye are detected.

According to aspects of the present disclosure, a tracked glint (i.e., short flash of light) may be detected as large amplitude pulses of narrow width whereas a tracked pupil will produce an absence of reflected light in a region of a scanned pattern. Advantageously, one or more discrete detectors may be selected to use a negative threshold for pupil tracking and/or a positive threshold for glint tracking thereby—and advantageously—enabling the discrimination between glint features and pupil features.

Of further advantage—and according to still further aspects of the present disclosure—signals produced and output from a plurality of detectors may be summed such that multiple glints may be detected by a single signal chain or that the effects of a non-uniform path length and/or lensing are equalized.

Advantageously—and according to aspects of the present disclosure, since all required relevant information is included in timing information received from the one or more discrete detectors and any timing of produced pulses, a projected pattern (Lissajous) is employed that advantageously produces a superior pulse density over a projected region of the eye. Of further advantage, when sufficient number of pulses are detected/collected by the multiple detectors, a contour of the glint and location(s) of eye features may be obtained.

An embodiment in accordance with the present disclosure is a system for estimating the corneal vector of an eye, the system comprising: a first source operative for providing a first optical signal, the first optical signal being characterized by a far-field pattern having a global intensity maximum; a first scanner operative for scanning the first optical signal within a scan region on the surface of the eye, the scan region including a surface feature of the eye; a first detector that is a discrete detector, the first detector being operative for providing a first electrical signal based on a second optical signal that includes a portion of the first optical signal reflected from at least a portion of the scan region; and a detection circuit operative for determining at least one maximum in the first electrical signal.

Another embodiment in accordance with the present disclosure is a system for estimating the corneal vector of an eye, the system comprising: a first source operative for providing a first optical signal, the first optical signal being characterized by a far-field pattern having a global intensity maximum; a first scanning mirror operative for scanning the first optical signal within a scan region on the surface of the eye; a first detector that is a discrete detector, the first detector being operative for providing a first electrical signal based on the detected intensity of a second optical signal that includes a portion of the first optical signal reflected from at least a portion of the scan region; a detection circuit operative for determining a first maximum in the first electrical signal at a first time and a second maximum in the first electrical signal at a second time; and a processor operative for estimating the location of the surface feature within the scan region based on the difference between the first time and second time.

Yet another embodiment in accordance with the present disclosure is a method for estimating the corneal vector of an eye, the method comprising: scanning a first optical signal within a scan region on the surface of the eye; receiving a second optical signal at a first detector that is a discrete detector, the second optical signal including a portion of the first optical signal that is reflected from at least a portion of the scan region; generating a first electrical signal based on the second optical signal, the first electrical signal being generated by the first detector; determining at least one maximum of the second optical signal; estimating the first position based on the at least one maximum; and estimating the corneal vector based on the first location.

Another embodiment in accordance with the present disclosure is a method comprising: steering a first beam of light in a two-dimensional pattern over a first region of an eye that includes a pupil, an iris, a cornea, and a lens; detecting light reflected from the first region; producing a first electrical signal that includes electrical pulses in response to the detection; and determining a feature of the eye by a characteristic of the electrical pulses so produced, wherein the characteristic is selected from the group consisting of pulse width, leading edge, and last edge.

Another embodiment in accordance with the present disclosure is a timer-based eye-tracking system comprising: a first scanner for steering a first beam of light in a two-dimensional pattern over a first region of the eye; a detector module for detecting light reflected from the first region and producing a first electrical signal that includes electrical pulses in response to the detection; and a processor configured to determine a feature of the eye based on a characteristic of the electrical pulses so produced, wherein the characteristic is selected from the group consisting of pulse width, leading edge, and last edge.

BRIEF DESCRIPTION OF THE DRAWINGS

FIG. 9(A), FIG. 9(B) and FIG. 9(C) are plots resulting from simulation results identifying photodiode detector coverage as a function of eye pitch vs eye yaw for: FIG. 9(A)—an IPD of 63 mm; FIG. 9(B)—an IPD of 59 mm; and FIG. 9(C)—an IPD of 70 mm; all according to aspects of the present disclosure.

FIG. 11 is a flow diagram showing one illustrative method for Lissajous projection optimization according to aspects of the present disclosure.

FIG. 12 is a flow diagram showing one illustrative method for ellipse fitting according to aspects of the present disclosure.

FIG. 13 is a flow diagram showing one illustrative method for pupil tracking according to aspects of the present disclosure.

Figure 1:
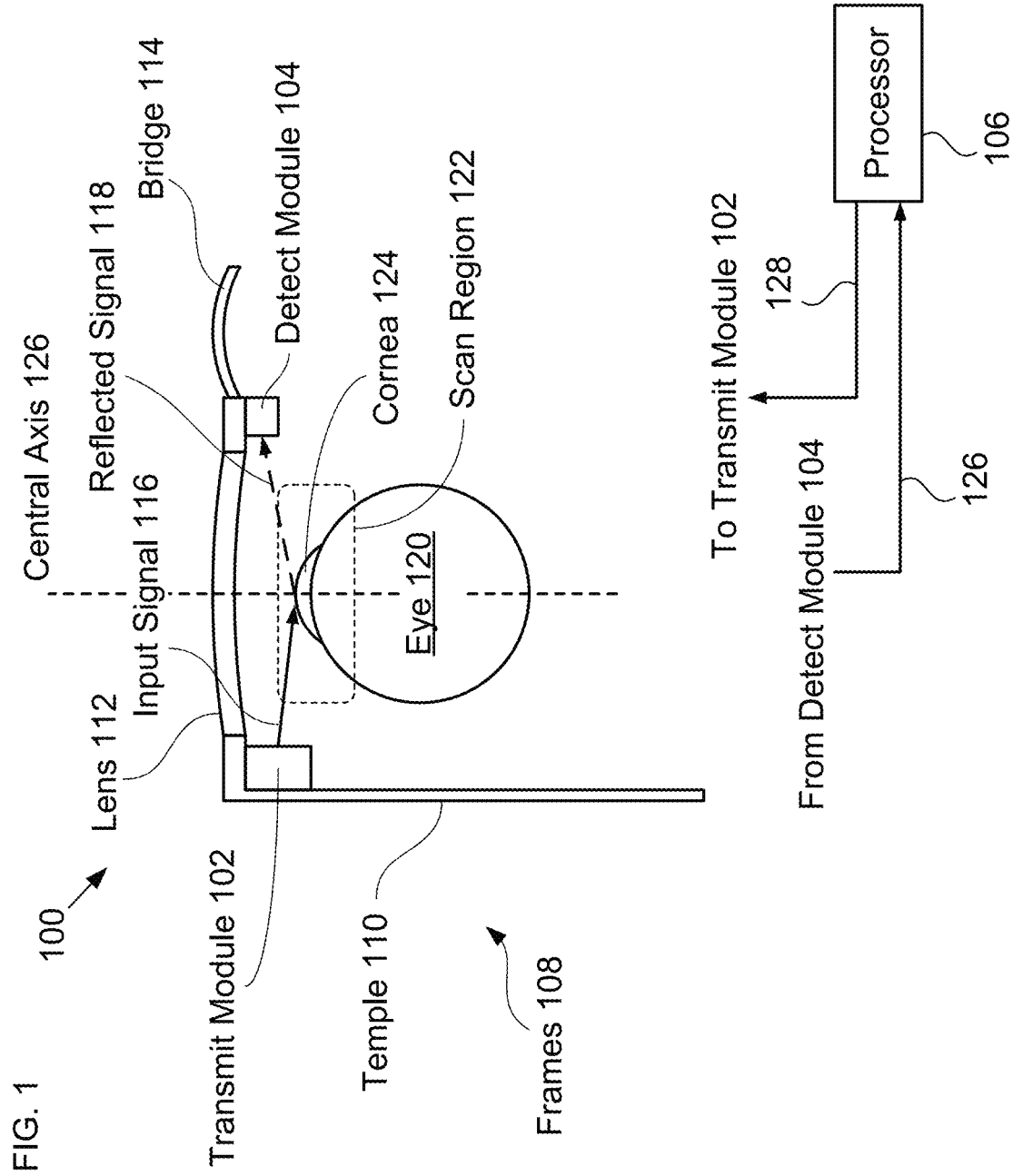
FIG. 1 depicts a schematic block diagram showing an illustrative eye tracking system according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DETAILED DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the Drawing, including any functional blocks that may be labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the FIGS. comprising the drawing are not drawn to scale.

As will become apparent to those skilled in the art, systems, methods, and structures according to aspects of the present disclosure advantageously extend the capabilities of gesture tracking systems disclosed in U.S. Patent Publication No. US2016/0166146 (hereinafter referred to as the '146 publication), which disclosed scanning microelectromechanical systems that determine the position of an eye by directing a beam of light towards the eye and determining the unique angle at which the beam reflects off the cornea of the eye to determine the direction of the gaze of the user. Systems in accordance with the '146 publication enable eye tracking that can be faster, lower power, more precise, and lower cost than prior-art video-based systems.

FIG. 1 shows a schematic block diagram illustrating an eye tracking system according to aspects of the present disclosure. As will be apparent to those skilled in the art by inspection of this figure and the following discussions, such illustrative systems constructed according to aspects of the present disclosure advantageously exhibit substantial improvements in size, cost, power consumption, bandwidth and precision as compared with prior art eye-tracking systems.

With reference to FIG. 1, illustrative system 100 includes one or more transmit module(s) 102, detect module(s) 104 (that may include multiple individual detectors)—not specifically shown, and processor(s) 106. Note that for simplicity in the drawing, only single module(s) are shown in this illustrative figure. Those skilled in the art will of course appreciate that the number(s) and function(s) of the module(s) are not fixed, and instead may include a plurality of same. Still further, their respective position(s) may likewise be varied from those illustratively shown including spaced-apart relative to one another and/or arranged in a pre-determined or no particular arrangement around—for example—eyeglass frames or goggles or shield or other mechanical support.

Continuing with our discussion, transmit module 102 and detect module 104 are illustratively shown arranged on a rigid support in a fixed orientation relative to an eye 120 of a test subject. As we shall show and describe, system 100 enables tracking of a surface feature (e.g., cornea 124 or other feature including pupil, iris, sclera—not specifically shown) within a two-dimensional region of an eye during typical test subject behavior (e.g., reading, viewing a computer screen, watching television, monitoring a scene, shopping, other consumer activities, responding to stimulus, etc.), and estimating and/or determining the corneal vector of the eye based on the location of the surface feature (and perhaps other characteristics).

For the purposes of this Specification, including the appended claims, the "corneal vector" or "gaze vector" of an eye is defined as the gaze direction of the eye. As may be readily appreciated by those skilled in the art, we note that the optical axis of an eye is not the same as a visual axis. More specifically, the optical axis may be substantially aligned—for illustrative example—with an optical centerline of the eye while the visual axis is more substantially aligned with a visual acuity location of the eye, namely the fovea centralis. The fovea is responsible for sharp central vision, which is necessary in humans for activities where visual detail is of primary importance, such as reading and driving. Accordingly, a gaze vector is preferably indicated by a vector extending outward along the visual axis. As used herein and as will be readily understood by those skilled in the art, "gaze" suggests looking at something—especially that which produces admiration, curiosity or interest—among other possibilities.

Transmit module 102 is a sub-system for providing an optical signal and scanning it in two-dimensions over a scan region 122 of eye 120. Transmit module 102 provides input signal 116, which is a light beam directed at eye 120. Exemplary transmit modules are described in detail in the '146 publication; however, it should be noted that transmit modules in accordance with the present invention are not limited to those disclosed in the '146 publication.

Detect module 104 is a sub-system for receiving light reflected from scan region 122, providing an electrical signal based on the intensity of the reflected light, and detecting—among other possible things—one or more maxima in the electrical signal. Exemplary detect modules are described in detail in the '146 publication; however, it should be noted that detect modules in accordance with the present invention are not limited to those disclosed in the '146 publication. As noted previously, while only a single detect module is shown in the illustrative FIG. 1, those skilled in the art will appreciate that more than one detect module may be employed—each having one or more individual detectors included therein. As will become further appreciated, such configurations including multiple detect modules and/or multiple detectors therein, provide additional data/information according to aspects of the present disclosure. We note at this point that the above discussion generally describes the detection of maxima. Advantageously, minima are also possible to detect in the case of the pupil. As we shall further show and describe, systems, methods and structures according to aspects of the present disclosure may detect/identify edges of features which may be more difficult to identify. In such an application, we may advantageously edge outlines of features and fit—for example—ellipses to facilitate their identification.

Continuing with our discussion of FIG. 1, processor 106 may be a conventional digital processor and controller (e.g., a microcontroller, microcomputer, etc.) operative for controlling transmit module 102, establishing system timing, and estimating the two-dimensional location of cornea 124 (for example) within scan region 122. In the depicted example, processor 106 communicates with transmit module 102 and detect module(s) 104 via wired connections (not shown) to transmit and receive control signals 126 and output signal 128. In some embodiments, processor 106 communicates with transmit module 102 and detect module 104 wirelessly. In some further embodiments, processor 106 is integrated in one of transmit module 102 and detect module(s) 104. Note further that in those embodiments including multiple detector modules there may be multiple output signal 128 lines communicating with processor. Note further that in those configurations including multiple detectors included as part of a single detector module, the multiple detectors may provide individual, multiple signal lines to the processor as well or may be locally processed by detector module thereby providing a single signal to the processor.

In the depicted, illustrative example, system 100 is mounted on eyeglass frames 108, which includes temples 110, lenses 112, and bridge 114. System 100 is shown mounted on frames 108 such that transmit module 102 and detect module(s) 104 are on opposite sides of central axis 126 of eye 120. Specifically, transmit module 102 is mounted on the frames such that it can scan input signal 116 over the full extent of scan region 122 and detect module(s) 104 is/are mounted on the frames such that it/they can receive a portion of input signal 116 reflected from scan region 122 as reflected signal 118. As noted previously, one or more detect module(s) may include one or more individual detectors which, as we shall show and describe, advantageously provide enhanced performance and informational value for systems, methods, and structures according to the present disclosure as compared with the prior art.

In particular, the specific location(s) of the one or more detect modules including one or more individual discrete detectors may be adjustable on the frame structures such that systems, method, and structures according to the present disclosure may advantageously provide enhanced informational value for a larger portion of the population. We note further that multiple detect modules and or multiple detectors advantageously improve robustness, more accurate eye profiles, geometry determinations, in addition to the improved gaze direction data already noted.

Figure 2A:
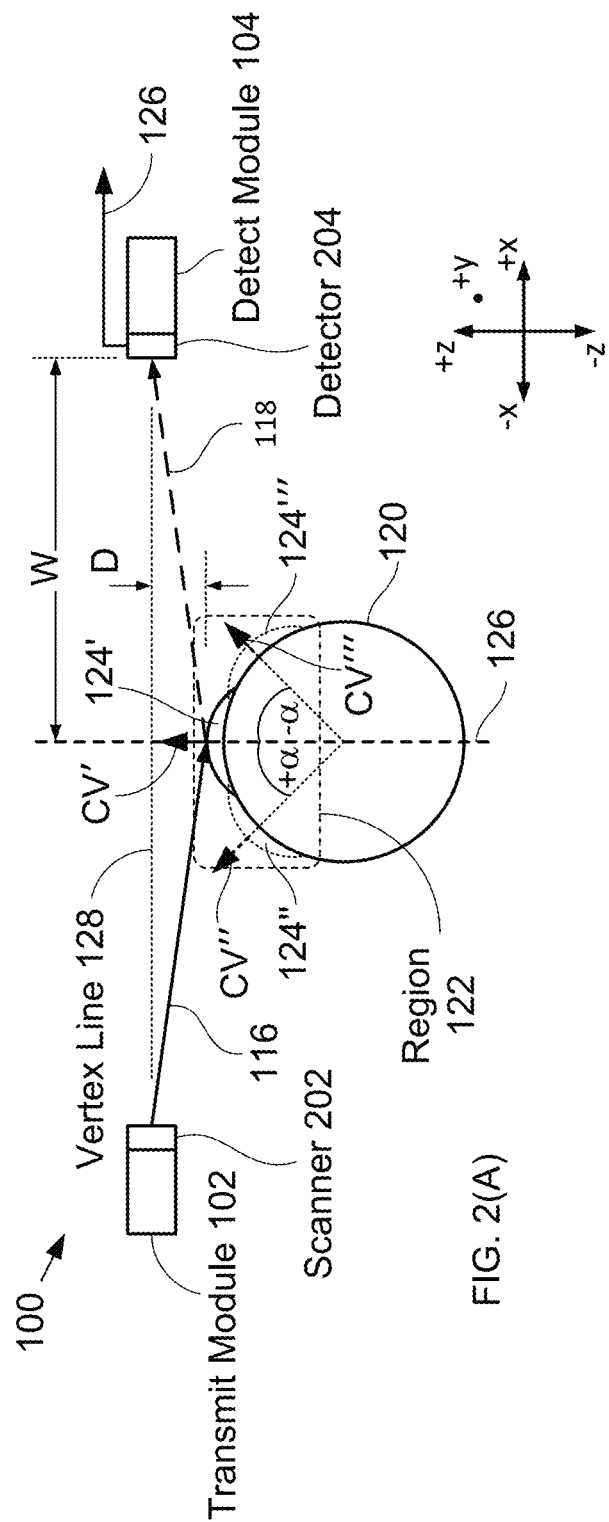
FIG. 2A depicts a schematic diagram showing an illustrative geometric arrangement of the system of FIG. 1 according to aspects of the present disclosure.

FIG. 2(A) is a schematic diagram depicting an illustrative geometric arrangement for system 100. At this point that it is noted that according to one aspect of the present disclosure that there exists a configuration of system 100 that gives rise to a unique point on cornea 124 that results in a maximum intensity in the reflection of input signal 116 (i.e., reflected signal 118) at detector(s) 204 of detect module(s) 104, where detector(s) 204 is/are a discrete detector. For the purposes of this disclosure, including the appended claims, a "discrete detector" is defined as an optoelectronic device having no more than four electrically independent detection regions on a single substrate, where each detection region is operative for providing one electrical signal whose magnitude is based on the intensity of light incident upon that detection region. Examples of discrete detectors include detectors having only one detection region, split detectors having two detection regions, four-quadrant detectors having four detection regions, and position-sensitive detectors. The definition of discrete detector explicitly excludes individual pixels, or groups of pixels, within array devices for collectively providing spatially correlated image information, such as focal-plane arrays, image sensors, and the like. When input signal 116 is aligned with this point, the angular positions of scanner 202 within transmit module 102 are indicative of the location of this point of maximum reflection within scan region 122, which is indicative of the corneal vector for the eye.

As may be observed from FIG. 2(A), are position(s) of cornea 124 at three gazing positions namely, (1) gazing straight ahead and aligned with central axis 126, as indicated by cornea 124' and corneal vector CV'; (2) gazing in the extreme positive direction, as indicated by cornea 124" and corneal vector CV"; and (3) gazing in the extreme negative direction, as indicated by cornea 124''' and corneal vector CV'''.

Figure 2B:
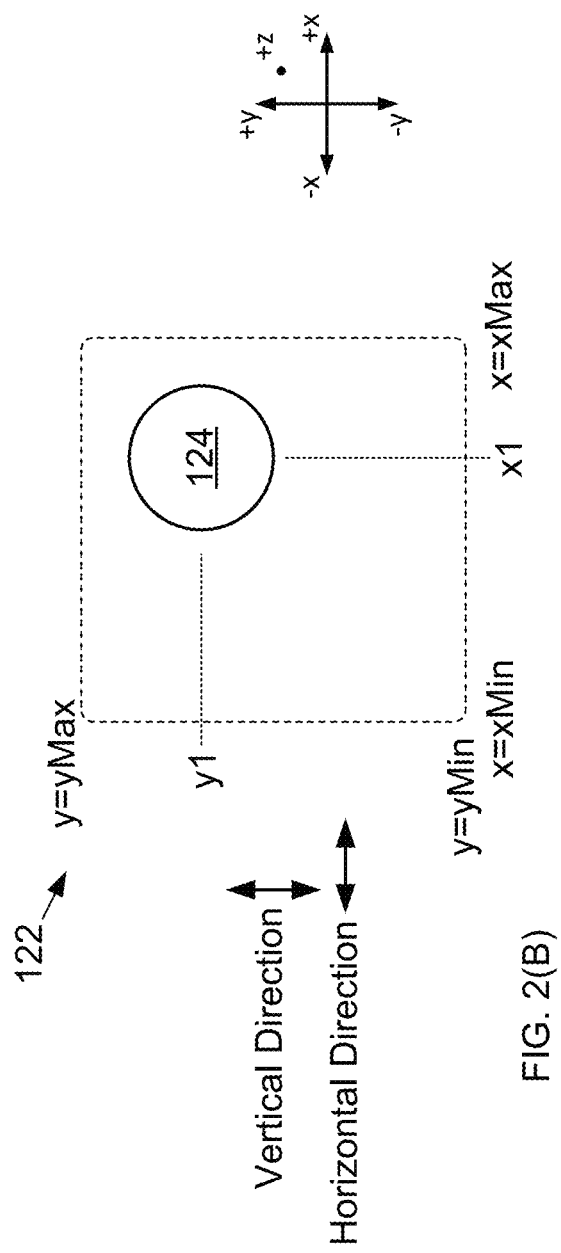
FIG. 2B schematic diagram showing illustrative scan regions for arrangements such as those depicted in FIG. 2(A) and others according to aspects of the present disclosure.

Turning now to FIG. 2(B), there is shown a schematic diagram depicting an exemplary scan region 122 of a subject eye. As illustratively depicted, scan region 122 extends from x=xMin to x=xMax and from y=yMin to y=yMax in the x- and y-directions, respectively.

During an illustrative operation of system 100, scanner 202 sweeps input signal 116 over scan region 122 in two dimensions. When the input signal is incident on cornea 124, reflected signal 118 (i.e., the corneal reflection) sweeps over detector 204. We note that during operation—and as we shall show an describe—the two-dimensional scan may occur simultaneously i.e., it moves in both directions simultaneously and may be projected onto the eye in a specific pattern to provide enhanced operation. It should be noted that the curvature of the cornea gives rise to a reflective condition that reduces the angle-of-reflection to a narrow range of scanner angles. The position of the scanner that corresponds to the maximum received intensity at the aperture of detector 204 is then used to calculate the location of the cornea, which is then used to estimate corneal vector CV.

As previously noted, the particular sweep of input signal may advantageously be shaped over scan region(s) such that a desired sweep density is achieved thereby producing a desirable (i.e., greatest) density of received pulses produced by the one or more discrete detectors. While the particular sweep shape is user definable, one particular shape—the Lissajous—produces a surprisingly effective sweep and therefore pulse densities.

Those skilled in the art will appreciate that a Lissajous curve—also known as a Lissajous figure—is the graph of a system of parametric equations defined by $x=A \sin(at+\delta)$; $y=B \sin(bt)$ In one exemplary operation, the sweep is performed such that the rate of change of the x coordinate is substantially the same as the rate of change of the y coordinate.

We note at this time that a typical human eye has an eyeball diameter of approximately 24 mm and a cornea having a 9 mm radius of curvature, with the cornea projecting a few millimeters above the eye, thereby defining a surface feature. Based upon this typical eye configuration, in the depicted illustrative example, transmit module 102 and detect module 104 are shown positioned symmetrically about central axis 126 at half-width, W, (half the normal distance across a typical eyeglass lens) of approximately 25 mm. Vertex line 128 is a straight line connecting the center of scanner 202 and the center of the aperture of detector 204. Vertex distance, D, (i.e., the distance between vertex line 128 and the apex of cornea 124 when the eye is aligned with central axis 126) is selected as approximately 14 mm. The locations of transmit module 102 and detect module(s) 104 are selected to substantially maximize the range over which a reflected signal 118 is received for all corneal locations within scan region 122.

We note that the configuration/distances described above are only for illustrative purposes only. As will be readily appreciated, the particular geometries/feature location(s) will vary from individual to individual. As such, systems, methods, and structures according to the present disclosure do not necessarily require the particular configurations noted. In particular, a scanner may be located in most any location providing optical paths to the surface of the eye and its scan region to be scanned. As such, the scanner may be positioned on the nose side, the bottom, or the outside—or practically any location—of the support frame. When so positioned, the multiple detector elements may be positioned circumferentially around the frame, or in other locations from which suitable reflections may be detected.

We note that the '146 publication referenced previously, discloses a method for determining eye position (i.e., corneal position) when a reflected light signal exhibits a maximum intensity. In contrast, systems, methods, and structures according to the present disclosure advantageously employ tracking methodologies that may advantageously include one or more of the following: pulse-width tracking; leading-edge tracking; last-edge tracking; modulated tracking; and noise-rejecting double sampling.

Pulse-Width Tracking Method

Figure 3:
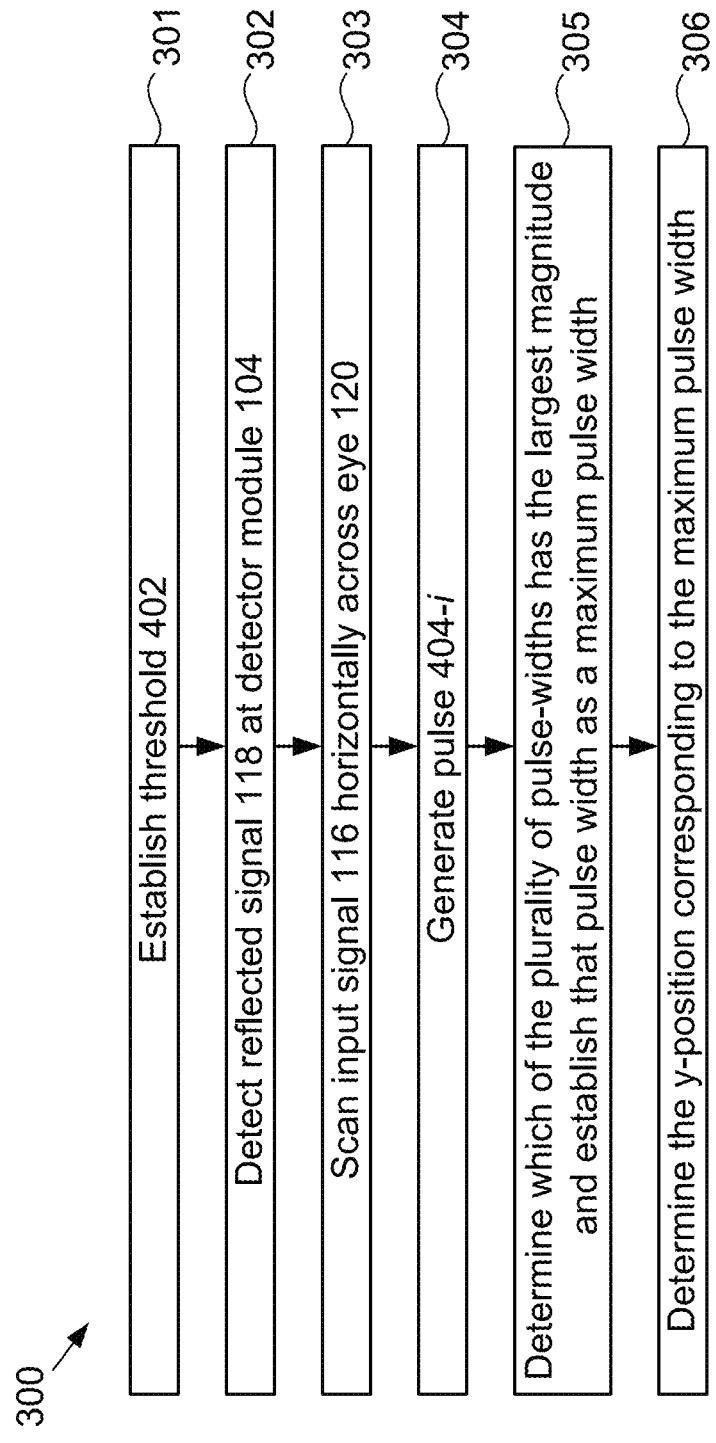
FIG. 3 depicts a flow diagram showing an illustrative eye tracking method according to aspects of the present disclosure.

Turning now to FIG. 3, there is shown a flow diagram depicting the general operations of a pulse-width tracking method in accordance with aspects of the present disclosure. We note that such method advantageously may be employed to produce pulse width information regardless of scan direction to effectively determine glint/pupil/other eye feature information. We describe method 300 herein with simultaneous reference to FIG. 1, FIG. 2(A), and FIG. 2(B), as well as reference to FIG. 4, and FIG. 5.

Returning to FIG. 3, pulse-width tracking method 300 begins at operational step 301, wherein a threshold 402 is established. We note that such threshold is advantageously user definable. By appropriately adjusting the threshold, systems, method, and structures according to the present disclosure—in addition to identifying glints—may advantageously identify quite subtle eye features such as interface between iris and pupil or other feature(s). Those skilled in the art will of course understand and appreciate that the identification of such subtle features—particularly during movement of an eye—has proven quite difficult to achieve in the art. Advantageously, systems, methods, and structures according to the present disclosure may effectively overcome such difficulties and provide informational value heretofore unknown in the art.

Continuing with our discussion of method 300 illustratively outlined in FIG. 3, at step 302, a reflected signal 118 is detected at detector module 104. Note that a pulse-width method for eye tracking according to aspects of the present disclosure advantageously exploits the relationship between a signal amplitude and a total signal time. When input signal 116 is scanned in a given direction—preferably at a constant rate—a reflected signal 118 is received at a detect module 104, which in turn provides output signal 126 in the form of a detection pulse, which appears for a finite time. The amount of time that the intensity of reflected signal 118 exceeds a pre-determined fixed threshold is proportional to the amplitude of the detection pulse.

Figure 4:
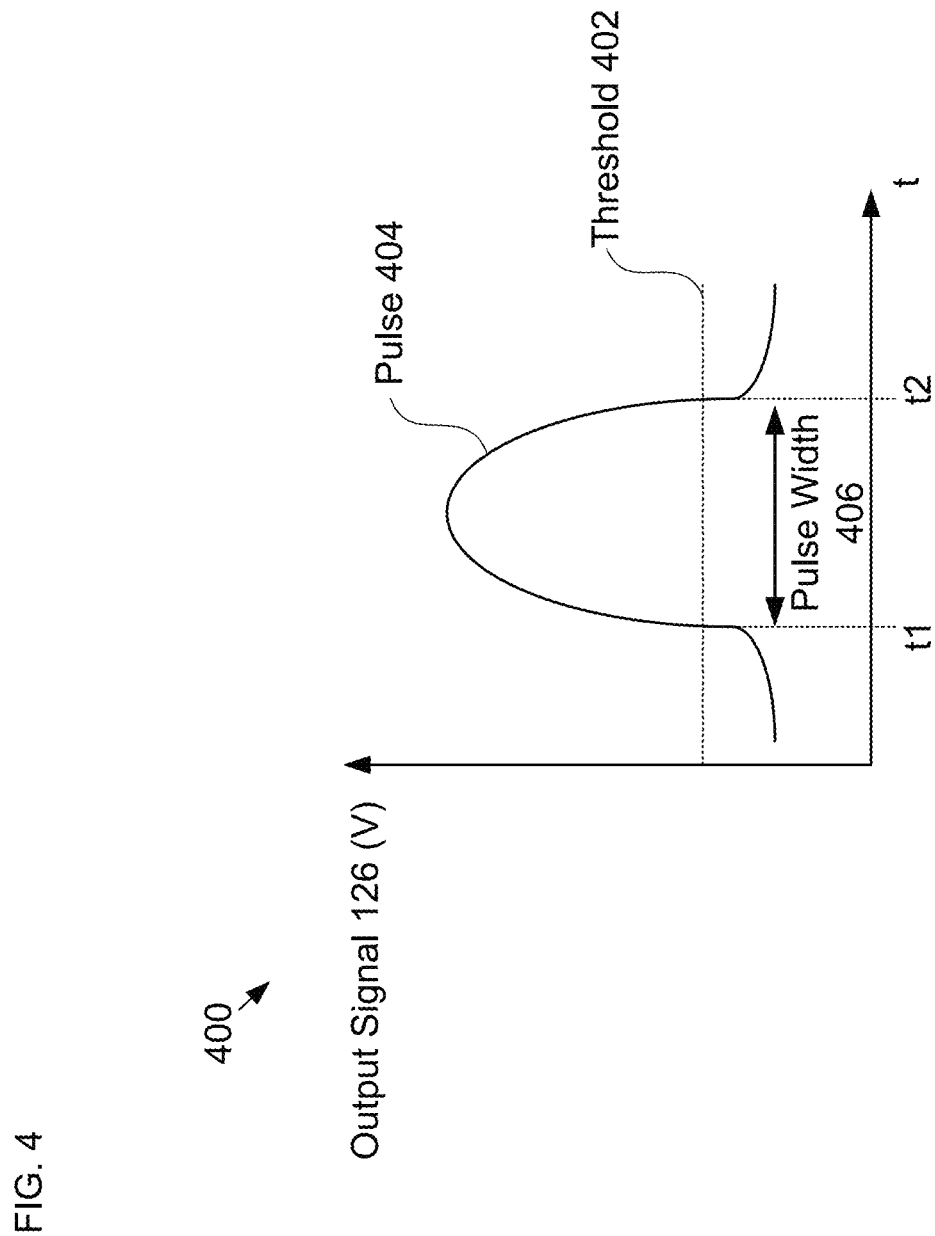
FIG. 4 is a plot of a simple output pulse according to aspects of the present disclosure.

Such operation may be understood with simultaneous reference now to FIG. 4. which shows a simplified plot of a representative detected pulse according to aspects of the present disclosure. As may be observed from that figure, plot 400 shows the amplitude of output signal 126 relative to threshold 402 as a function of time, t. As depicted in plot 400, output signal 126 takes the shape of pulse 404, which crosses threshold 402 in the rising direction at time, t1, and crosses threshold 402 in the falling direction at time, t2. The pulse width of pulse 404 (i.e., pulse width 406), therefore, is equal to t2-t1.

Continuing our discussion of the flow diagram of FIG. 3, at operation 303, for each of 1=1 through N, where N has any practical integer value, input signal 116 is scanned in a predetermined pattern about scan region. As those skilled in the art will readily appreciate, a simplified scan operation may proceed horizontally from xMin to xMax at a different y-position, yi, on eye 120 in a manner analogous to a raster operation. Of course—and as noted throughout this disclosure—systems, methods, and structures according to aspects of the present disclosure advantageously do not typically proceed in such a rasterized manner. In sharp contrast, systems, methods, and structures according to the present disclosure will preferably scan a pattern such as the Lissajous previously identified and in that advantageous manner will produce a scan/output signal density that is surprisingly much more effective that the simplified raster.

At step 304, for each of i=1 through N, pulse 404-$i$ is generated by detector module 104 and its pulse width 406-$i$ is determined. While not specifically shown in the flow diagram, those skilled in the art will understand and appreciate that the detection may be accomplished by one or more detector modules each including one or more individual detector elements.

Figure 5:
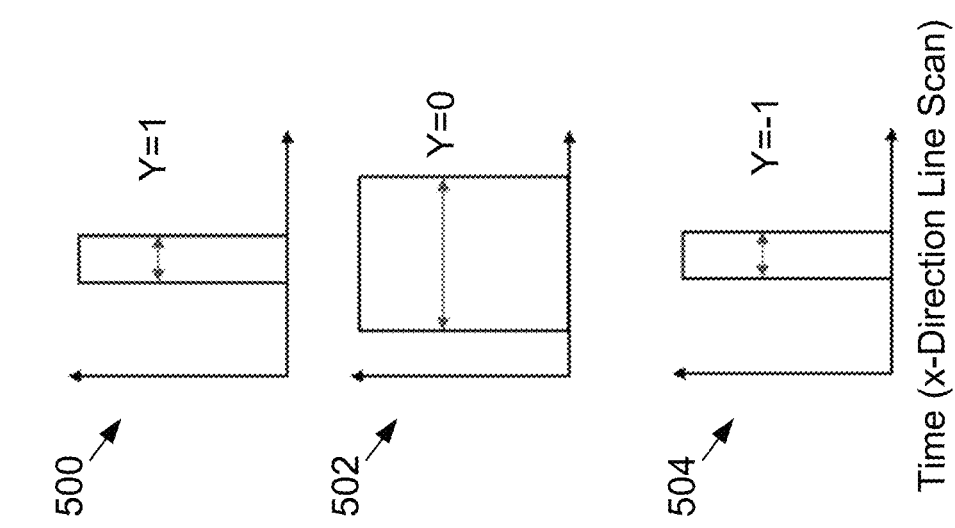
FIG. 5 shows a series of plots a plot of a simple output pulse according to aspects of the present disclosure.

FIG. 5 shows a series of plots depicting pulse-width tracking in according to aspects of the present disclosure. Note that in this specific example, the tracking is illustratively performed in the vertical direction. As shown in that figure, plots 500, 502, and 504 show pulses 404 taken at three different y-positions—namely, y=1, 0, and −1, respectively.

With reference once again to FIG. 3 flow diagram, at step 305, a profile of pulse widths is generated based on pulses 404-1 through 404-N. At step 306, a maximum pulse width, b, is determined from the profile of pulse widths.

Figure 6:
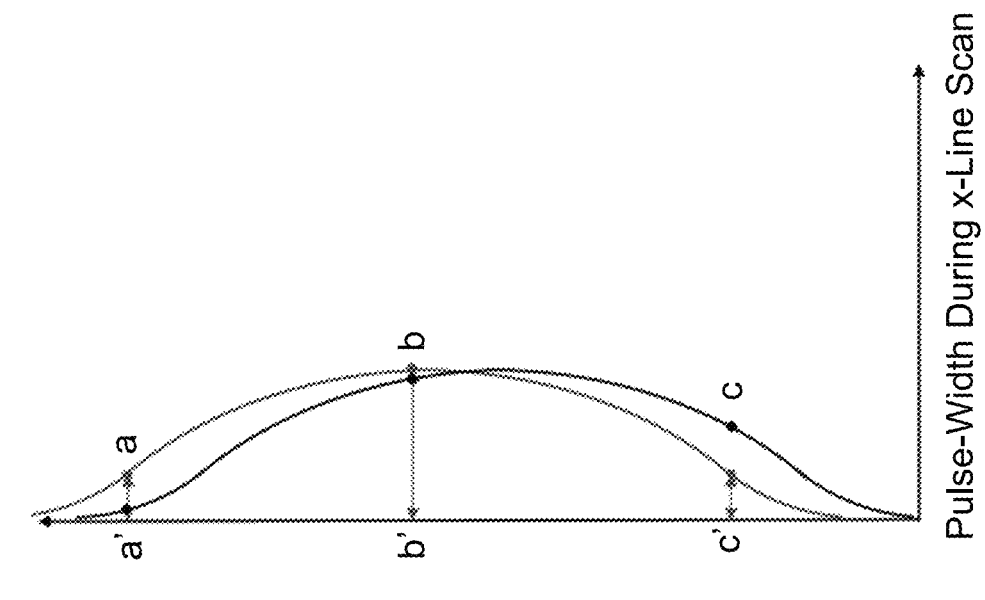
FIG. 6 shows a series of plots illustrating pulse-width profiles taken for an eye in two different positions according to aspects of the present disclosure.

FIG. 6 shows a series of plots depicting pulse-width profiles taken for an eye in two different positions according to aspects of the present disclosure. As may be observed from that figure, plot 600 includes pulse-width profiles 602 and 604, which are taken while eye 120 is in a first and a second orientation(s). In the illustratively depicted example, these two orientations are at the same x-position but at different vertical positions. We note that points a, b, and c as shown in FIG. 6 correspond to the pulse-width values determined for x-direction scans at three y-positions on eye 120 when the eye is in the first orientation. Point "b" corresponds to the maximum pulse width for this eye orientation, while points a and c correspond pulse width values for scans taken at other y-positions on the eye.

Finally—with respect to FIG. 3 flow diagram—at step 307, the y-position associated with the maximum pulse width is determined.

At this point we again note that systems, methods, and structures according to the present disclosure may advantageously employ the pulse-width method and resulting derived information therefrom when any scan direction is employed. Accordingly, this disclosure is advantageously not limited to the simplified, x and y directions illustratively employed for discussion purposes.

Returning once again to FIG. 6, we note that when eye 120 moves from its first orientation to its second orientation, the pulse-width profile shifts upward, as indicated in the figure. In this second orientation, the peak width values for x-direction scans taken at the same three y-positions as above are indicated by a', b', and c'. It should be noted that in this illustrative example, a small vertical movement of the eye gives rise to a large change in the measured difference in width between points a' and c' relative to the initial difference in width between a and c. As a result, systems, methods, and structures according to aspects of the present disclosure will advantageously achieve a high signal-to-noise ratio (SNR) by employing a controller that minimizes the width difference between a' and b'.

It should be noted that, although the depicted example employs a closed-loop controller, open loop control can be used without departing from the scope of the present disclosure.

Leading-Edge Tracking Method

Leading-edge vertical tracking exploits the relationship between signal amplitude and earliest signal time (i.e., t1). By way of illustrative example, when an input beam 116 is scanned horizontally across the eye (i.e., in the x-direction), a detection pulse appears on the output signal of detector 204 for a period of time. When compared to fixed threshold 402, the earliest time the pulse appears above the threshold, t1, is proportional to the amplitude of the pulse. A profile of rising edges is generated by performing a plurality of x-direction scans at different y-positions. Comparing the timing of these rising edges enables the determination of an earliest rising edge, which can then be used for vertical tracking.

As previously noted, exemplary x, y, direction scans are used herein for illustrative purposes only. Accordingly, the tracking methods described herein may advantageously be employed in systems, methods, and structures according to aspects of the present disclosure regardless of a specific scan direction.

Last-Edge Tracking Method

Last-edge tracking exploits the relationship between signal amplitude and last signal time. When input beam 116 is scanned in the x-direction, a detection pulse appears on the output signal of detector 204 for a time. When compared to fixed threshold 402, the last time the magnitude of the pulse is equal to or greater than the threshold (i.e., t2) is proportional to the amplitude of the pulse. As a number of x-direction scans are performed at different y-positions, a profile of falling edges is generated. Comparing the timing of these falling edges allows for the determination of a last rising edge, t2, which is used for vertical tracking.

Modulated Tracking Method

According to aspects of the present disclosure, periodically turning the light source in transmit module 102 on/off at a high frequency advantageously enables enhanced SNR in tracking. In such embodiments, detect module 104 includes a detector circuit (e.g., a phase-locked loop, etc.) that is tuned to the on/off frequency of the source, enabling it to pick up the desired signal while rejecting interfering signals.

Noise-Rejection Double-Sampling Method

Finally, we note that systems, methods, and structures according to aspects of the present disclosure may employ a noise-rejection double-sampling technique in which low-frequency noise in output signal 126 can be rejected by software that enables double sampling.

Figure 7:
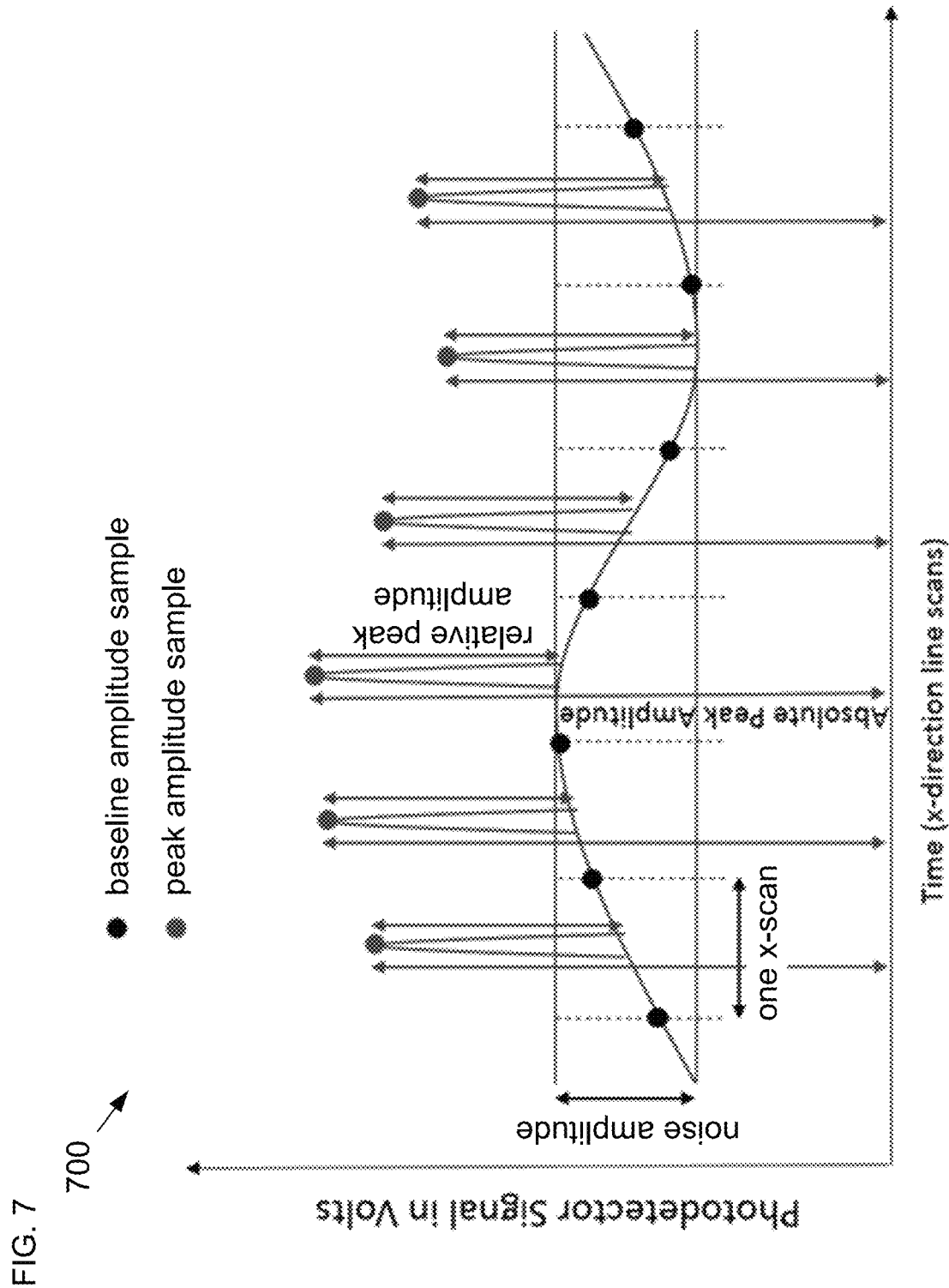
FIG. 7 shows a plot illustrating noise-rejection double sampling according to aspects of the present disclosure.

Turning now to FIG. 7 there is shown a plot illustrating noise-rejection doubling sampling according to aspects of the present disclosure. As may be observed and as shown in plot 700, the baseline amplitude is measured at the beginning and end of each scan. The peak amplitude during the scan is also measured. The amplitude of the peak relative to the baseline (rather than the absolute amplitude of the peak) can be determined by comparing it to the baseline measurements. The relative peak amplitude can be obtained by subtracting the first baseline measurement from the peak amplitude, or by subtracting the end baseline measurement from the peak amplitude. The relative peak amplitude can also be obtained by interpolating the baseline amplitude at the peak using the two baseline measurements. Using the timestamp of the peak and both baseline measurements allows for a linear interpolation of the peak's baseline amplitude. Higher order interpolations can be used for greater accuracy if more previous baseline measurements are stored. In this way, low frequency noise that shows in the peak's absolute amplitude becomes negligible when the relative amplitude is captured. Note further that in noise-rejection double sampling it may be useful to adjust laser power such that the detected power at the beginning and/or end of a cycle are at a prescribed level. this is related to optical power modulation as well. In optical power modulation one purpose is to normalize for beam velocity, however here, we may also normalize for uniformity as well.

With these techniques in place, we may now describe some additional, particularly distinguishing aspects of systems, methods, and structures according to the present disclosure.

Lissajous Scan Patterns

Figure 8:
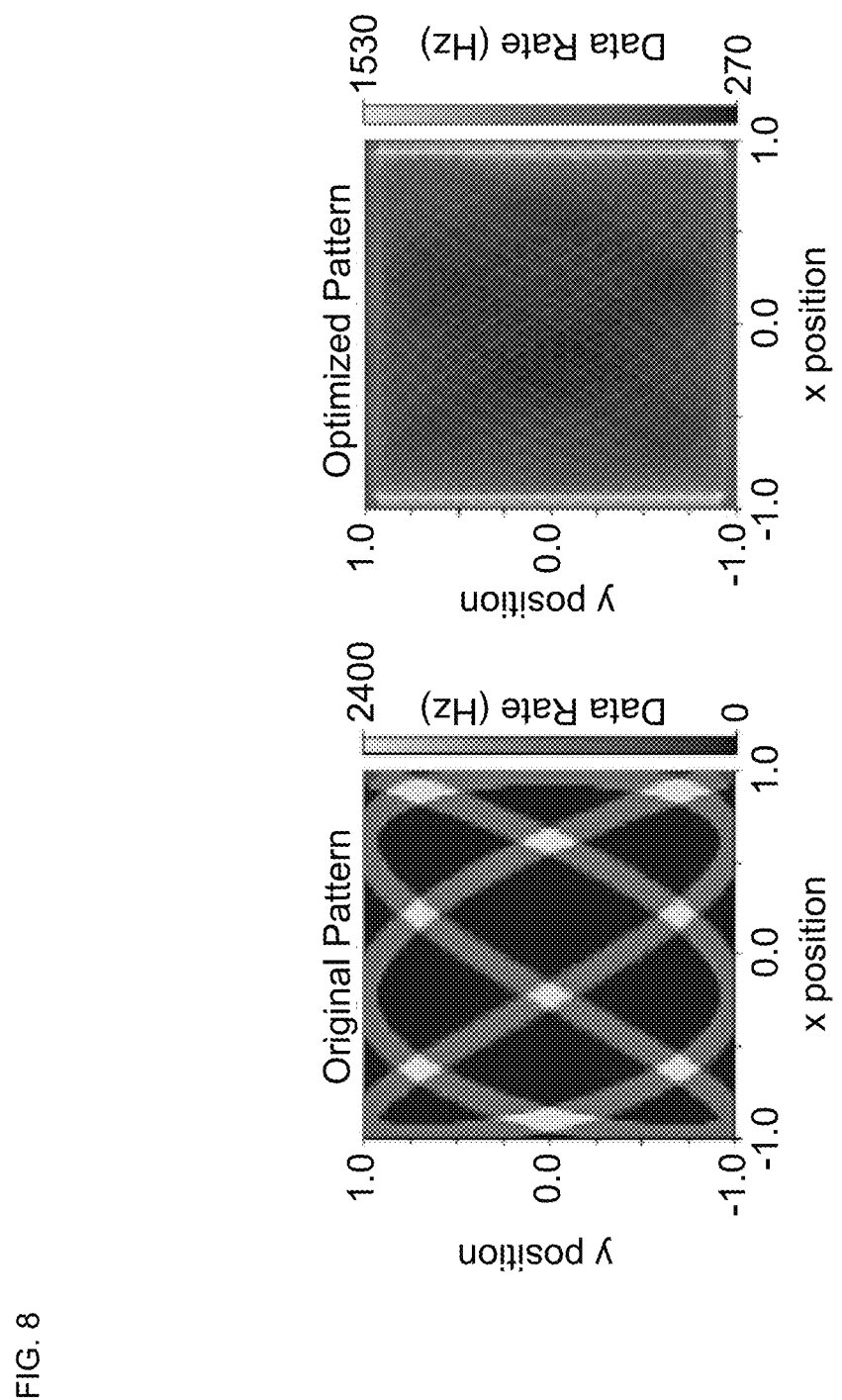
FIG. 8 shows a schematic diagram illustrating a Lissajous curve pattern as may be projected onto a surface of an eye and a more optimized Lissajous curve pattern according to aspects of the present disclosure.

As noted previously, a preferred projected scan pattern includes a family of curves commonly known as Lissajous curves. One characteristic of such curves that that they generally move sinusoidally in both axes simultaneously. Operationally—with systems, methods and structures according to the present disclosure that may advantageously employ MEMS devices, both x, and y axis of the MEMS are driven near their resonant frequencies which advantageously results in enhanced power and mechanical range(s). Of further advantage, we have determined that Lissajous curves provide a superior scan pattern for a given surface, as it permits a very fast (fastest) scan speed for a given mechanical system having mechanical bandwidth constraints. FIG. 8 illustrates a representative Lissajous curve pattern that may be projected onto a subject eye and a more optimized Lissajous pattern according to aspects of the present disclosure.

As will be further understood an appreciated by those skilled in the art, not all Lissajous curves exhibit the same pattern density. Accordingly, when scanning to determine glints (eye features) one wants to cover a scan area in a reasonably short period of time such that the feature is also located within the reasonably short period of time. As will be understood, the specific density of pattern projected onto the eye is a function of the drive frequencies of the MEMS device employed.

Still, it is noted that during operation, if a particular glint is detected and subsequently tracked, it may be possible to set/adjust a DC component of the scanner to target or otherwise "zero in" on that glint thereby allowing the scanner to operate at substantially resonance in one of the two dimensions. Such operation advantageously permits use of more sparse patterns thereby requiring tighter duration constraints and increasing a report rate of glint tracking.

We note further that when tracking multiple glints, or when tracking in a manner that is tolerant of slip, the scanner may require a larger can range such that all of the glints are sufficiently detected. In such a situation, the relative density of the projected pattern should be higher, as the individual glints are smaller with respect to the particular size of the scan window employed. In such a circumstance, the duration constraint must be relaxed and the report rate of individual glints must be decreased.

Operationally, steps associated with an illustrative Lissajous projection optimization are shown in flow diagram of FIG. 11 and may be defined as follows:

1. Scan a horizontal line at a vertical offset that produces pulses at one of several photodiodes;
2. Sweep the frequency of the signal that drives the horizontal axis while measuring the pulse width received by the photodiode;
3. The resonant frequency of the MEMS scanner corresponds to the frequency at which the pulse width is minimized. The slope of the phase of the pulse with respect to the drive signal should be at a maximum at this frequency as well. The phase should shift by 180 degrees as the device sweeps through its resonance as well;
4. Select a frequency that is offset from resonance (e.g., 10% higher or lower);

5. Perform steps 1-4 for the vertical axis;
6. While running both axes at their selected frequencies, measure the pulse density received by each of the photodiodes; and
7. Fine tune the frequencies in order to maximize the pulse densities received at the various photodiodes.

At this point we note that one way of identifying the center of a glint or feature is to determine the pulse width and average the location of all mid-points in that vicinity while performing a Lissajous scan. Such a technique advantageously shown to be surprisingly effective while exhibiting a lower computational cost than ellipse fitting. Furthermore, a center of mass may be created by weighting each mid-point by its pulse width, i.e., the larger the pulse width the greater the likelihood that it is the point that represents the center of the glint.

Panning Scan Pattern

Note that while a Lissajous pattern exhibiting a fixed extent is projected towards an eye it is possible to adjust DC voltages in drive signals to "pan" the pattern around the eye. If a glint is being detected while the pattern is being panned, its timing will be offset by an amount corresponding to the shift in the pattern. This timing information may be advantageously used to center the projected pattern around a glint or to position the pattern such that multiple glints are captured for a given eye (user) with a specific inter-pupil distance (IPD) and eye relief.

Ellipse Fitting Via Pulse Width Contour

As previously described, an output pulse is conveniently described—in the context of systems, methods, and structures according to the present disclosure—as a duration in time between when a detector output signal exceeds some predetermined threshold to when it falls below that predetermined threshold. In that sense, each pulse provides measurement of two locations (in time) namely when the pulse signal crosses this threshold on the rise and the fall. Therefore, if we know the scan pattern—that is the beam location as a function of time—then each pulse effectively measures two spatial location where the signal is equal to the threshold.

Accordingly, as the beam scans, we measure a number of locations where the signal is equal to the threshold. The set of these points is known as the contour (like on a map) of the detector intensity at the given threshold. If the threshold is set such that a contour of a glint is captured, the pulses will form an ellipse shape over time. We note that the actual shape depends on scan beam shape, local corneal curvature, and photodetector shape—among others—but nevertheless, an elliptical contour results. We can then employ fitting functions on a sparse set of the contour points (say, all of the points gathered in a particular period of time—say 10 milliseconds) to fit an ellipse which advantageously provides a low-latency measurement of glint location. Still further, when one has identified a range of ellipse dimensions that may be encountered, those dimensions may be advantageously used to discriminate between corneal glints and disturbances thereby enhancing any determinations made with respect to actual features.

Of course, those skilled in the art will appreciate that such techniques facilitate the capture/contouring of multiple glints on a same detector through use multi-model-fitting techniques.

We note that it may be necessary to determine which detected glints are ones to keep and which ones are to be rejected. One illustrative technique to reject outlier ellipses (RANSAC—Random Sample Consensus) involves choosing a random subset of the ellipses, predict which direction they should be moving and apply that predicted direction to the remaining ellipses. The one(s) that do not fit the model get rejected. An illustrative method of ellipse fitting is depicted in a flow diagram of FIG. 12 and may be described as follows:

1. For a given photodiode, collect rising and falling edge timings for a period of time;
2. Fit an ellipse to the contour defined by these points;
3. Use an algorithm (e.g., RANSAC) to reject outlier ellipses;
4. Relate some aspect of the geometry of the ellipse (e.g. its' center, size, orientation) to a glint location, which serves as an input to the eye model and;
5. Using multiple ellipses from multiple photodiodes, use the eye model to produce an estimate of the gaze direction.

Pupil Tracking (Pupillometry)

As we have noted previously, systems, methods, and structures according to aspects of the present disclosure may advantageously detect reflections resulting from other eye features/structures such as the edge of the pupil reflection as well as sclera reflections. As with corneal reflections, such feature/structure reflections may be employed to determine gaze direction and tracking as well. We note that such feature/structure reflections may be quite subtle, and therefore any pulse width thresholds must be set sufficiently low so that signals associated with such features/structures are adequately detected and subsequently identified.

Operationally, systems, methods, and structures according to aspects of the present disclosure will set a threshold at a predetermined point such that edges of structures are detected and then determine the shape of the pupil from the timings of threshold crossing in any (arbitrary) directions.

One illustrative method for pupillometry according to aspects of the present disclosure is shown in the flow diagram of FIG. 13. As shown, such method includes the following steps:

1. Measure the signal levels corresponding to specular glints from the cornea, diffuse reflections from the iris, and the lower signal levels (lack of iris reflection) from the pupil;
2. Set a threshold voltage for a comparator between the low-level signal from the pupil and the diffuse reflection signal level from the iris;
3. Capture pulses that correspond to the pupil edge transitions for a period of time and perform ellipse fitting technique described above; and
4. Apply correction factors to compensate for the refractive index of the cornea/lens and the direction in which the eye is pointing in order to reveal the pupil size.

At this point we note that when attempting pupillometry, the signals are not necessarily low as they are determined by the contrast from pupil to iris. The contrast is actually quite high—although orders of magnitude less than a glint. One significant problem with pupillometry is that of non-uniform illumination/sensitivity across a scan range. In other words, pupillometry is negatively impacted by the non-uniform illumination wherein the path length between scanner and detector varies across the scan range as reflected from the features of the eye. An increased path length drops the detected signal and therefore creates gradients that makes fixed threshold pupil detection difficult. Advantageously, and according to still further aspects of the present disclosure, one way to overcome this infirmity is to sum the signals from multiple photodetectors such that the average path length of the beam(s) is roughly equal as compared with any signal drop magnitude created by the pupil. Such summing may also be performed in a weighted matter such that the signal is "leveled" against the background. This calibration may occur—for example—when a user has their eyes closed so as to optimize a uniform diffuse reflection signal in the absence of the pupil thus making pupil detection easier.

We note further that systems, methods, and structures may advantageously adjust laser power dynamically to compensate for non-uniform illumination. In addition, the gain(s) or threshold(s) may be dynamically adjusted to mitigate the non-uniform illumination as well.

Optical Power Modulation with Scan Angle

Note that the amount of light received by an individual photodiode depends upon its location with respect to the glint, and also with respect to the portion of the Lissajous pattern that is illuminating the glint. If the corneal glint location is sufficiently close to the scanner but far from the photodiode, its brightness is lower due to the lensing effect of the cornea, which spreads/broadens the (originally collimated) beam. Near the edges of the Lissajous pattern, the velocity of the scanned beam is lower, which implies that a spot "dwells" on the photodiode for a longer period of time. As such, if a photodiode preamplifier includes an integrating component, we may equalize a received signal by modulating a source amplitude (i.e., VCSEL) with respect to the velocity of the scanning beam.

According to still additional aspects of the present disclosure, since the timing of signals may be distorted by the sinusoidal trajectory of the beam, we may take the arcsin of any pulse timing to advantageously obtain linearized, position information.

Glint Rejection Using Multiple Detectors

Occasionally, a corneal glint as measured by one detector may "fall off" of the cornea and "turn into" a scleral glint. While this transition is oftentimes marked by a transient signal, if that transient signal is not noticed or otherwise missed—with only one detector—it is difficult to determine whether a glint is a corneal or scleral glint. When multiple detectors are employed—each having their own respective glint locations—a geometric configuration may be configured such that it is likely most glints are in fact corneal. Advantageously, systems, methods, and structures according to aspects of the present disclosure may employ such multiple detectors as noted previously and throughout this disclosure.

Figure 9A:
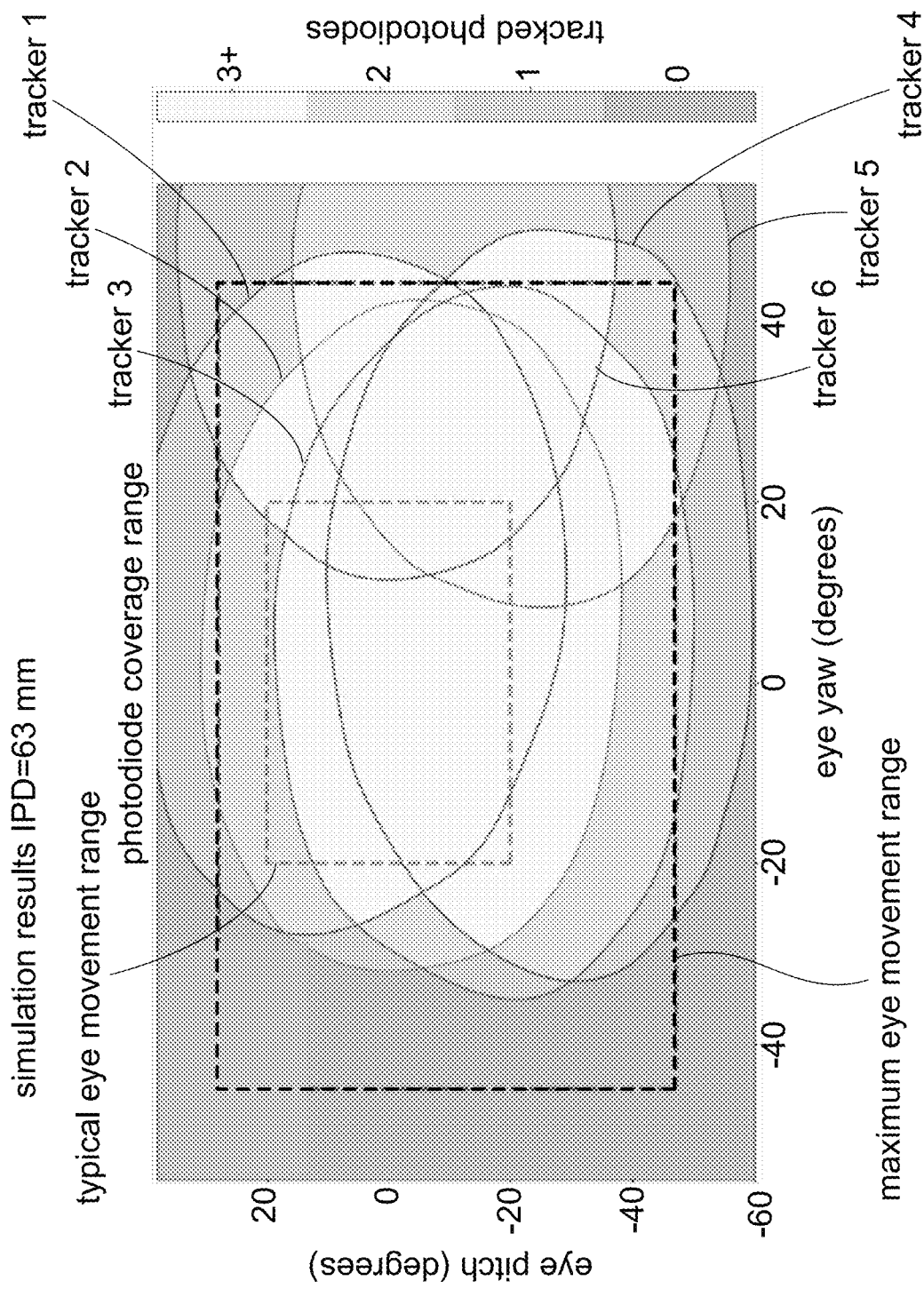
Figure 9B:
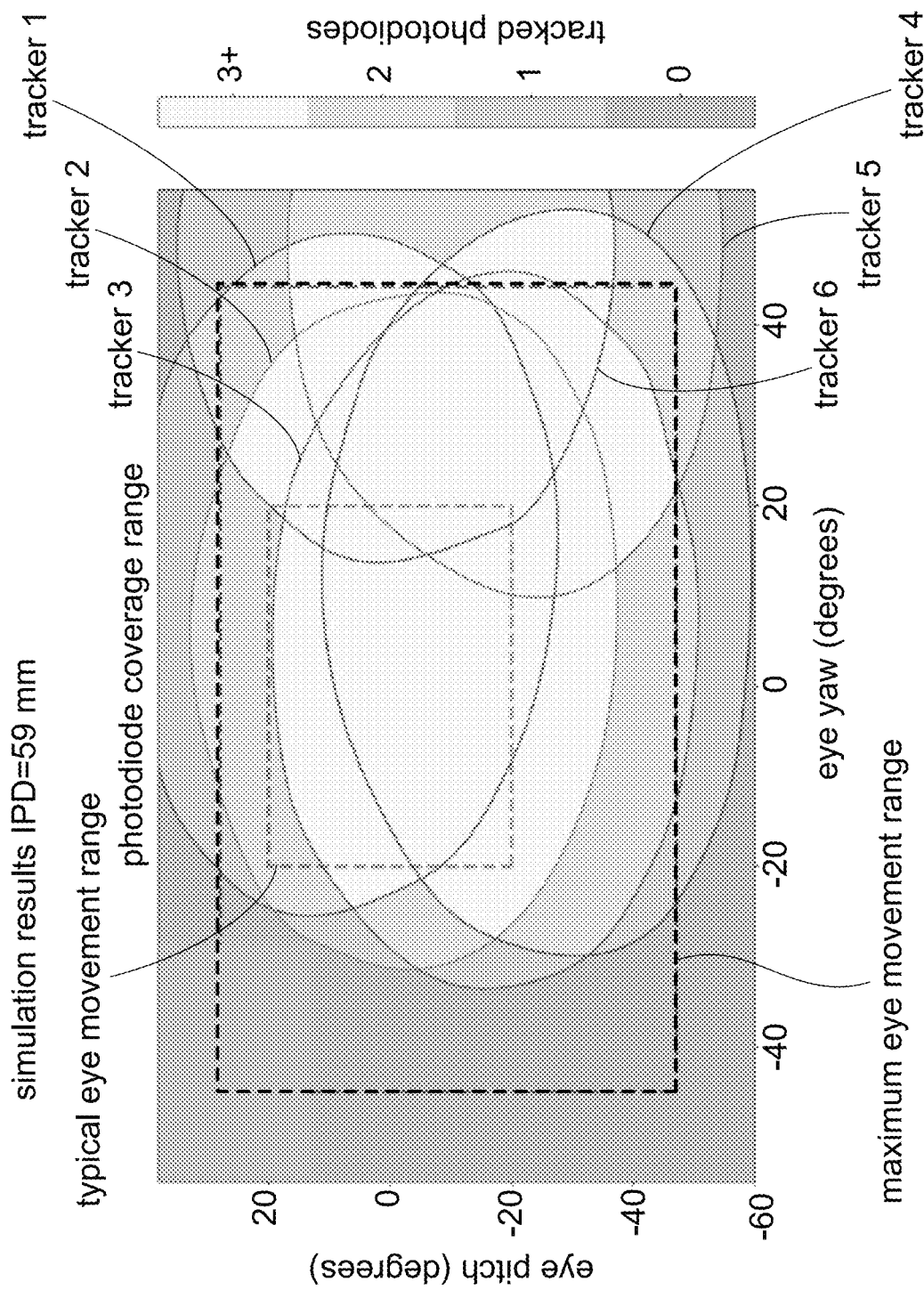
Figure 9C:
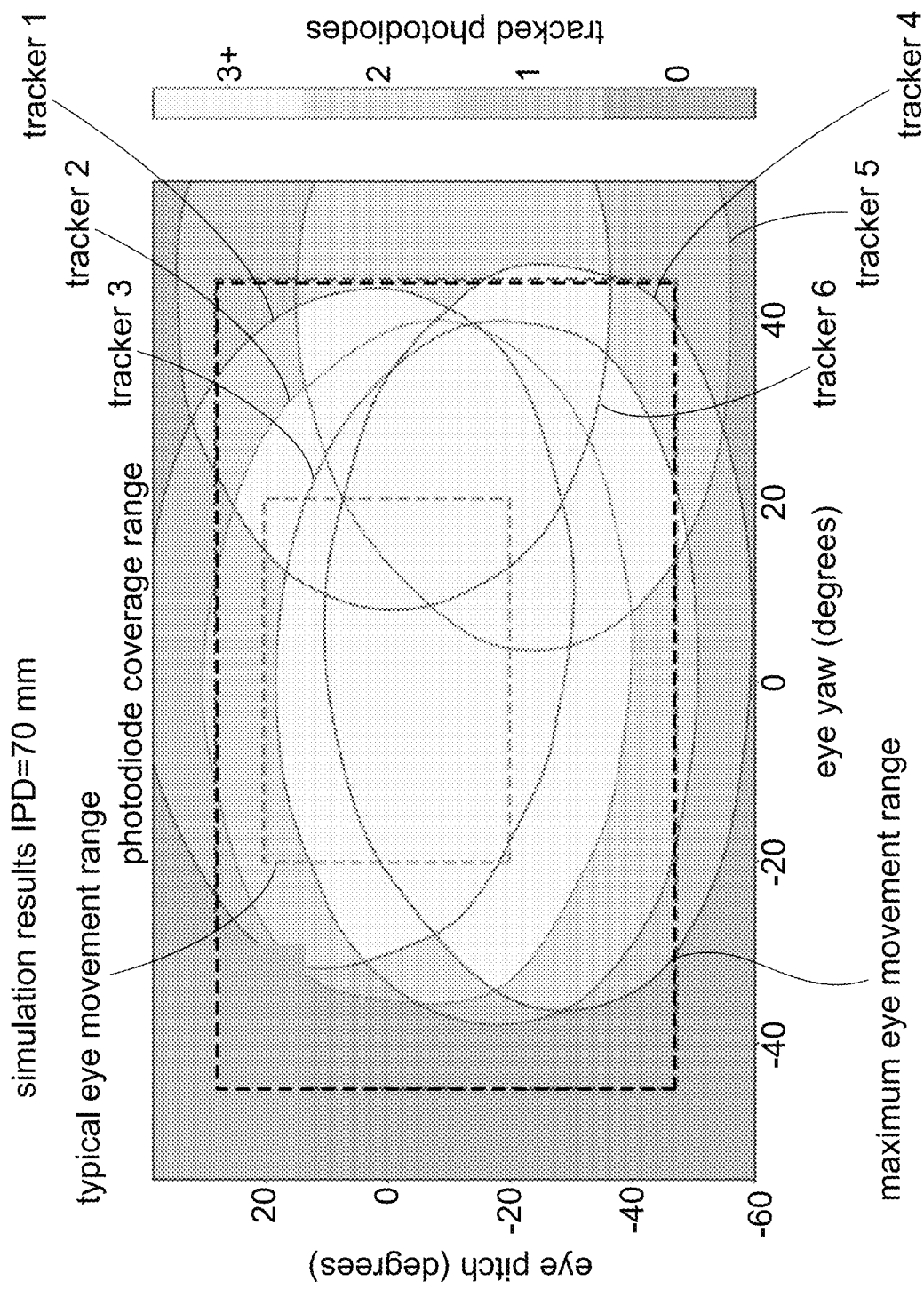

FIG. 9(A), FIG. 9(B) and FIG. 9(C) are plots resulting from simulation results showing multiple-photodiode detector coverage as a function of eye pitch vs eye yaw for arrangements having an IPD of 63 mm, 59 mm, and, 70 mm, respectively, according to aspects of the present disclosure.

We note that if we make some reasonable assumptions about the sphericity of the cornea as a specular reflector, we can then construct a model which compares the glints with each other to determine whether an individual glint "disagrees" with other glints' locations. Such a model advantageously permits the detection of glints that do not appear to be corneal and can be therefore used to mark glints as something other than corneal glints (i.e., non-corneal). Note however, that just because a glint does not lie on the cornea does not preclude that glint from providing useful information—particularly in the ophthalmological context noted previously.

Multiple Light Sources

As previously noted, multiple light sources may be advantageously employed in systems, methods, and structures according to aspects of the present disclosure. As will be further appreciated by those skilled in the art, measuring the distance of something is difficult if scanning from only a single perspective because distance has an inverse relationship with apparent size, and so has poor sensitivity across range. If one employs two scanners, then two perspectives are created thereby providing this additional information.

Multi-Clock Domain Synchronization

Finally, we note that when resonating at a given frequency, one expects a detector to detect (see) two pulses for a given feature: one on the forward pass, and one on the reverse pass. In phase space (between 0 and 360 degrees) this represents two distinct coordinates, the average of which is the phase offset between the detector and the scanner. If the detector does not know the phase of the scanner that is to say the scanner and detector are on separate clocks which may drift from each other over time, the detector can determine the phase offset between itself and the scanner, by measuring a line of symmetry that separates all the forward pass pulses and all the reverse pass pulses. With the phase offset known, it is then possible to reverse this phase offset, and convert the pulse from phase space, back into positional space which mathematically amounts to running through an inverse trigonometric function).

When both axes of the scanner (for example—MEMS) are in resonance as is the case during Lissajous scanning, we extend the same idea, except now there are 4 pulses for each feature (forward+up, forward+down, reverse+up, reverse+down). We then determine a line of symmetry in each axis, and this represents the phase offset in both axes—which can be different, due to different mechanical properties of the two axes.

If we are constantly tracking the phase offsets over time as pulses are detected, then we effectively are constantly synchronizing the clocks between the two systems, without having to perform any additional synchronization over other channels.

Operationally, illustrative steps for clock synchronization according to aspects of the present disclosure may be defined by:

First, capture pulse timings using one timer while projecting a Lissajous pattern over the eye by driving a MEMS scanner with a different timer. Note, these timers are derived from different clock sources.

Figure 10:
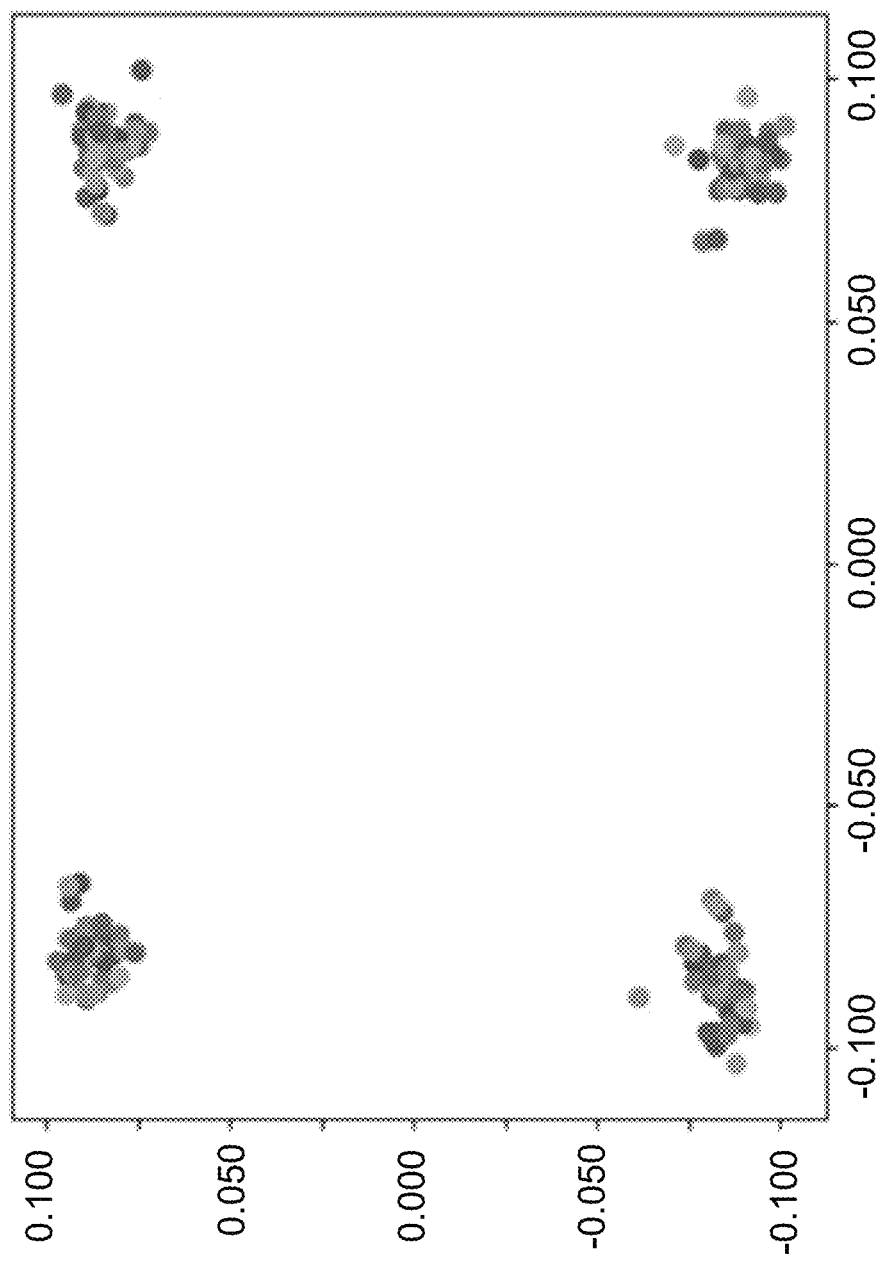
FIG. 10 is a plot of pulses for clock synchronization in multi-clock configurations in terms of its delay with respect to a local X and Y timer that is set to frequencies near the drive frequencies according to aspects of the present disclosure.

Next, plot each pulse in terms of its delay with respect to a local X and Y timer that is set to frequencies near the drive frequencies as shown in FIG. 10. This effectively converts timer values into phase space, since we know that the drive signal period corresponds to a full 360 degrees. Note further that the scale of the x axis corresponds to a full cycle of the x-drive signal (360 degrees) and the scale of the y axis corresponds to a full cycle of the y-axis drive signal (360 degrees).

The resulting plot should produce 4 clusters of points for a given photodiode, which correspond to the beam sweeping across the detector in each direction (forward+up, forward+down, reverse+up, reverse+down). Accordingly, compute the lines of symmetry between these clusters in the horizontal and vertical directions.

Next, apply any necessary offsets in order to place these lines of symmetry in the center of the plot.

These offsets are then used to synchronize the receiving clock to the clock that is driving the MEMS scanner.

It is to be understood that the disclosure teaches just some examples of illustrative embodiments and that many variations of the invention can easily be devised by those skilled in the art after reading this disclosure and that the scope of the present invention is to be determined by the following claims.

What is claimed is:

1. A timer-based eye-tracking method comprising:
   steering a first beam of light in a two-dimensional pattern over a first region of an eye that includes a pupil, an iris, a cornea, and a lens;
   detecting light reflected from the first region;
   producing a first electrical signal that includes electrical pulses in response to the detection;
   comparing the electrical pulses to a first threshold to determine the characteristic;
   determining a feature of the eye by a characteristic of the electrical pulses so produced, wherein the characteristic is selected from the group consisting of pulse width, leading edge, and last edge;
   identifying a first plurality of times when the magnitude of the electrical pulses crosses the first threshold; and
   establishing a first contour of the feature based on the first plurality of times.

2. The method of claim 1 further comprising determining the position of the first beam of light in at least one dimension within the first region based on a first time at which the electrical pulse magnitude is equal to the first threshold.

3. The method of claim 1 further comprising:
   determining a first value of the first electrical signal that corresponds to diffuse reflection from the iris;
   determining a second value of the first electrical signal that corresponds to the pupil;
   establishing the first threshold such that it is between the first and second values;
   performing an ellipse fitting technique based on a plurality of times at which the first electrical signal crosses the first threshold; and
   estimating a pupil size based on the fitted ellipse.

4. The method of claim 3 further comprising:
   detecting the light reflected from the first region at multiple detectors that provide a plurality of second electrical signals; and
   summing the plurality of second electrical signals to realize the first electrical signal.

5. The method of claim 3 further comprising applying at least one correction factor to the fitted ellipse to compensate for at least one of (1) a refractive index of the cornea, (2) the refractive index of the lens, and (3) a gaze direction of the eye.

6. The method of claim 1 wherein the feature is the pupil.

7. The method of claim 1 further comprising:
   identifying a second plurality of times when the magnitude of the electrical pulses crosses a second threshold; and
   establishing a second contour of the feature based on the second plurality of times.

8. The method of claim 1 further comprising determining a gaze direction of the eye based on the detected reflected light.

9. The method of claim 1 wherein the first beam of light is steered in the two-dimensional pattern based on at least one drive signal that includes a direct current (DC) component, and wherein the method further includes adjusting the DC component to induce a shift in the two-dimensional pattern.

10. The method of claim 9 wherein the shift induces panning of the first beam of light such that it is steered in the two-dimensional pattern over a second region of the eye.

11. The method of claim 1 wherein the light reflected from the first region is detected by multiple detectors that provide a plurality of electrical signals that includes the electrical pulses, the plurality of electrical signals including the first electrical signal.

12. The method of claim 11 further comprising:
   making a first comparison of the electrical signals of the plurality thereof; and
   determining the feature of the eye based further on the first comparison.

13. The method of claim 11 further comprising:
   establishing a first threshold for the first electrical signal;
   establishing a second threshold for a second electrical signal of the plurality thereof; and
   comparing the electrical pulses to at least one of the first and second thresholds to determine the characteristic.

14. The method of claim 1 wherein the first beam of light is modulated.

15. The method of claim 1 further comprising steering a second beam of light in a two-dimensional pattern over the first region of the eye.

16. A timer-based eye-tracking system comprising:
   a first scanner for steering a first beam of light in a two-dimensional pattern over a first region of the eye;
   a detector module for detecting light reflected from the first region and producing a first electrical signal that includes electrical pulses in response to the detection; and
   a processor configured to:
   determine a feature of the eye based on a characteristic of the electrical pulses so produced, wherein the characteristic is selected from the group consisting of pulse width, leading edge, and last edge;
   compare the electrical pulses to a first threshold to determine the characteristic; and
   determine a first contour of the feature based on a first plurality of times at which a magnitude of the electrical pulses crosses the first threshold.

17. The system of claim 16 wherein the detector module includes a plurality of detectors for detecting light reflected from the first region and producing a plurality of electrical signals that collectively define the first electrical signal.

18. The system of claim 16 further including a second scanner for steering a second beam of light in a two-dimensional pattern over the first region.

19. The system of claim 16 wherein the processor is further configured to establish a second contour of the feature based on a second plurality of times when the magnitude of the electrical pulses crosses a second threshold.

20. The system of claim 16 wherein the processor is further configured to determine a gaze direction of the eye based on the detected reflected light.

21. The system of claim 16 wherein the first scanner steers the first beam of light in response to a first drive signal, and wherein the first drive signal includes a direct current (DC) component that is controllable to induce a shift in the first two-dimensional pattern.

22. The system of claim 21 wherein the shift pans the first light signal such that it is steered in the two-dimensional pattern over a second region of the eye.

* * * * *